United States Patent [19]

Donneky et al.

[11] Patent Number: 5,004,188

[45] Date of Patent: Apr. 2, 1991

[54] AIRBRIDGE

[75] Inventors: Peter Donneky, Wiltshire, England; Peter T. Gacs, Portola Valley, Calif.

[73] Assignee: GEC Mechanical Handling Limited, England

[21] Appl. No.: 339,618

[22] PCT Filed: Aug. 3, 1988

[86] PCT No.: PCT/GB88/00640

§ 371 Date: Jun. 5, 1989

§ 102(e) Date: Jun. 5, 1989

[87] PCT Pub. No.: WO89/00946

PCT Pub. Date: Feb. 9, 1989

[30] Foreign Application Priority Data

Aug. 3, 1987 [GB] United Kingdom ............... 8718300

[51] Int. Cl.$^5$ ............................................. B64D 9/00
[52] U.S. Cl. ...................... 244/137.002; 244/137.001; 14/71.005; 14/71.003
[58] Field of Search .................... 244/137.2, 137.1; 14/71.5, 71.3

[56] References Cited

U.S. PATENT DOCUMENTS

| | | | |
|---|---|---|---|
| 3,537,745 | 11/1970 | Herring, Jr. | 14/71.5 |
| 3,808,626 | 5/1974 | Magill | 14/71.5 |
| 3,839,760 | 10/1974 | Nagy | 14/71.5 |
| 3,843,987 | 10/1974 | Lodjic | 14/71.5 |
| 4,110,859 | 9/1978 | Lichti | 14/71.5 |
| 4,559,660 | 12/1985 | Lichti | 14/71.5 |
| 4,852,197 | 8/1989 | Thomas, Jr. | 14/71.5 |

FOREIGN PATENT DOCUMENTS 0040465 11/1981 United Kingdom ............ 244/137.2

Primary Examiner—Joseph F. Peters, Jr.
Assistant Examiner—Christopher P. Ellis
Attorney, Agent, or Firm—Kirschstein Ottinger, Israel & Schiffmiller

[57] ABSTRACT

An airbridge having an extendable passageway terminating in a cabin assembly incorporates an elevating support structure provided by a single vertical elevator leg which supports both the cabin assembly and the adjacent end of the passageway. The airbridge has a single elevator leg which preferably projects through the cabin assembly between the floor and the top of the cabin, with the cabin assembly offset partially to one side of the longitudinal axis of the passageway to provide a path which permits traversal of passengers through the cabin assembly on one side of the elevator leg.

4 Claims, 3 Drawing Sheets

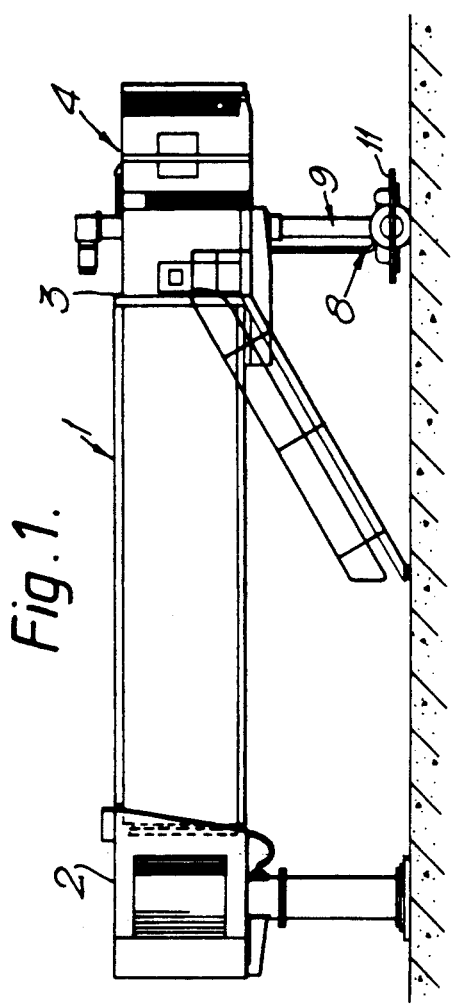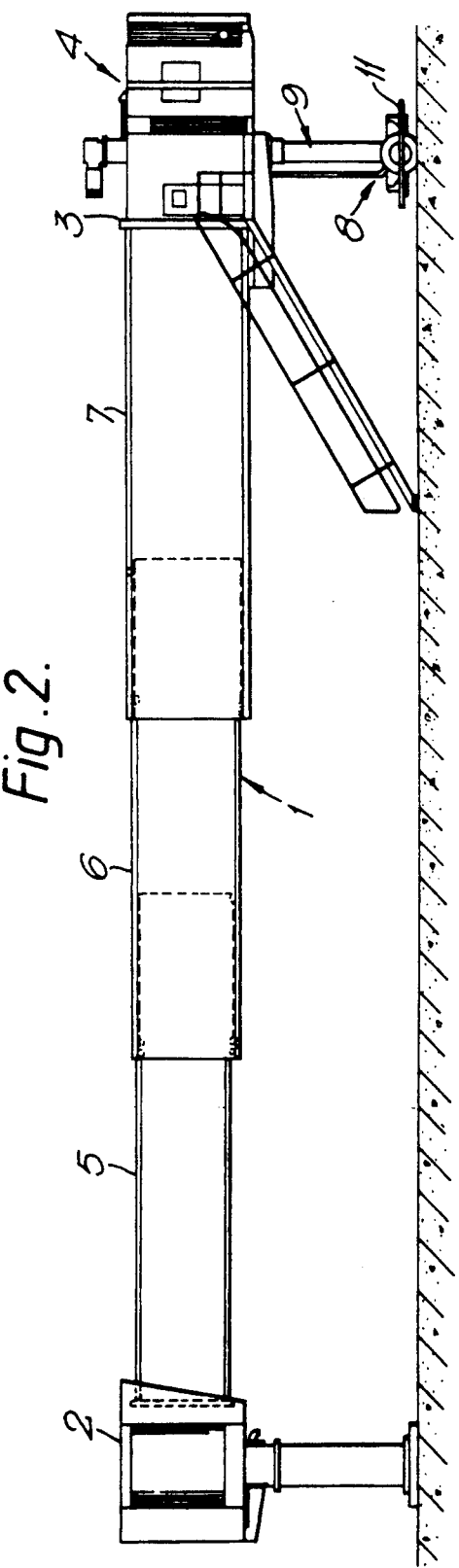

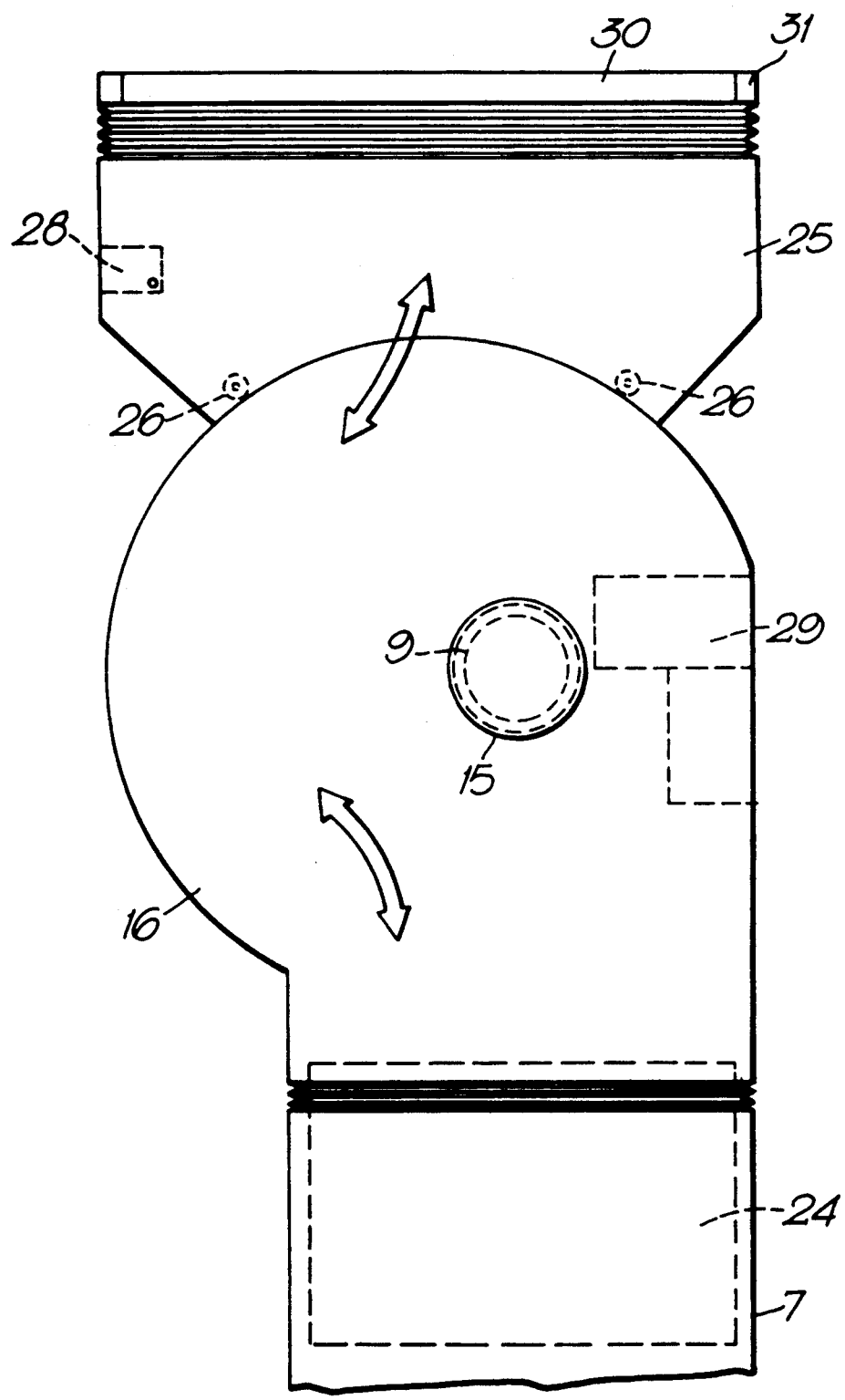

AIRBRIDGE

BACKGROUND OF THE INVENTION

1. Field of the Invention

This invention relates to aircraft loading bridges, commonly called airbridges, which provide a covered passageway for facilitating the transfer of passengers between an aircraft standing in a parked position at an airport and an airport terminal building, such airbridges consisting of a number of telescoping sections which are parked in a retracted state but which can be extended to reach and dock with an aircraft when the aircraft is appropriately parked for loading and unloading, the airbridge terminating in a cabin assembly having a door engageable with a door opening of the aircraft, to provide an access between the bridge and the aircraft.

2. Description of Related Art

It will be appreciated that an airbridge has to be capable of co-operating with different aircraft types in which the aircraft doors are at varying heights from the ground, as well as being extendable to engage the aircraft and being angularly movable to a limited extent, and for this purpose the airbridges are usually mounted on wheeled support structures incorporating elevating means for raising and lowering the airbridge.

Usually in such support structures the elevating means comprises a pair of elevating legs supporting the end section of the telescopic passageway, and positioned approximately midway along the section. Such an arrangement suffers from the disadvantage that as the structure is spaced some distance from the cabin assembly, any movement of the elevating legs becomes multiplied at the cabin end which complicates the control system, especially as the amount of correction that needs to be applied depends upon the length to which the airbridge has been extended in each particular case.

In addition, as the elevating legs are adjusted to raise or lower the airbridge, the resultant angular variation of the airbridge with respect to the ground will cause the legs to be tilted to a lesser or greater extent from the vertical, which imposes undesirable stresses on them.

SUMMARY OF THE INVENTION

One object of the invention is to provide a form of airbridge in which these disadvantages are substantially avoided.

Accordingly in an airbridge according to the present invention the elevating support structure is coupled to the cabin assembly, and means are provided for maintaining the floor of the cabin assembly and the axis of the elevating means substantially horizontal and substantially vertical respectively through varying angles of inclination of the passageway.

It will be seen that by locating the support structure at the cabin assembly position, instead of some appreciable distance from it, the control system for raising and lowering the airbridge is considerably simplified, as movement of the cabin assembly corresponds precisely with that of the elevating means.

In a preferred form of the invention the elevating means comprises a single elevator leg disposed with its axis passing through the cabin assembly substantially on the longitudinal axis of the passageway section, and the cabin is offset partially to one side of the passageway.

The use of a single elevated leg has the advantage that the need for synchronisation, which is essential where two elevating legs are employed, is avoided, and the offsetting of the cabin provides adequate room for passengers to pass through the cabin without hindrance. Thus the distance between the elevator leg and the wall of the cabin assembly across the path of the passengers, is preferably not less than the minimum width through which the passengers have to pass along other parts of the airbridge.

Preferably the elevating leg is pivotably coupled to beams projecting forwardly from the passageway section of the airbridge adjacent to the cabin assembly, such that the elevating leg serves to support that passageway section directly as well as the cabin, so avoiding undue stresses being placed on the hinges connecting the cabin assembly to the passageway section.

Preferably the cabin assembly carries a level detector switch which is actuated on departure of the assembly from the horizontal, and serves to energize means, such as a jack, acting between the cabin assembly and the adjacent passageway section, to return the assembly to the horizontal position. This also ensures that the elevator leg is maintained substantially vertical.

BRIEF DESCRIPTION OF THE DRAWINGS

One embodiment of the invention will now be described by way of example with reference to FIGS. 1 to 4 of the accompanying schematic drawings, in which FIGS. 1 and 2 represent side elevations of an airbridge constructed in accordance with the invention in the retracted and extended positions respectively.

FIG. 4 represents a plan section of the cabin end of the airbridge in purely diagrammatic form.

DETAILED DESCRIPTION OF THE PREFERRED EMBODIMENT

Figure 3:
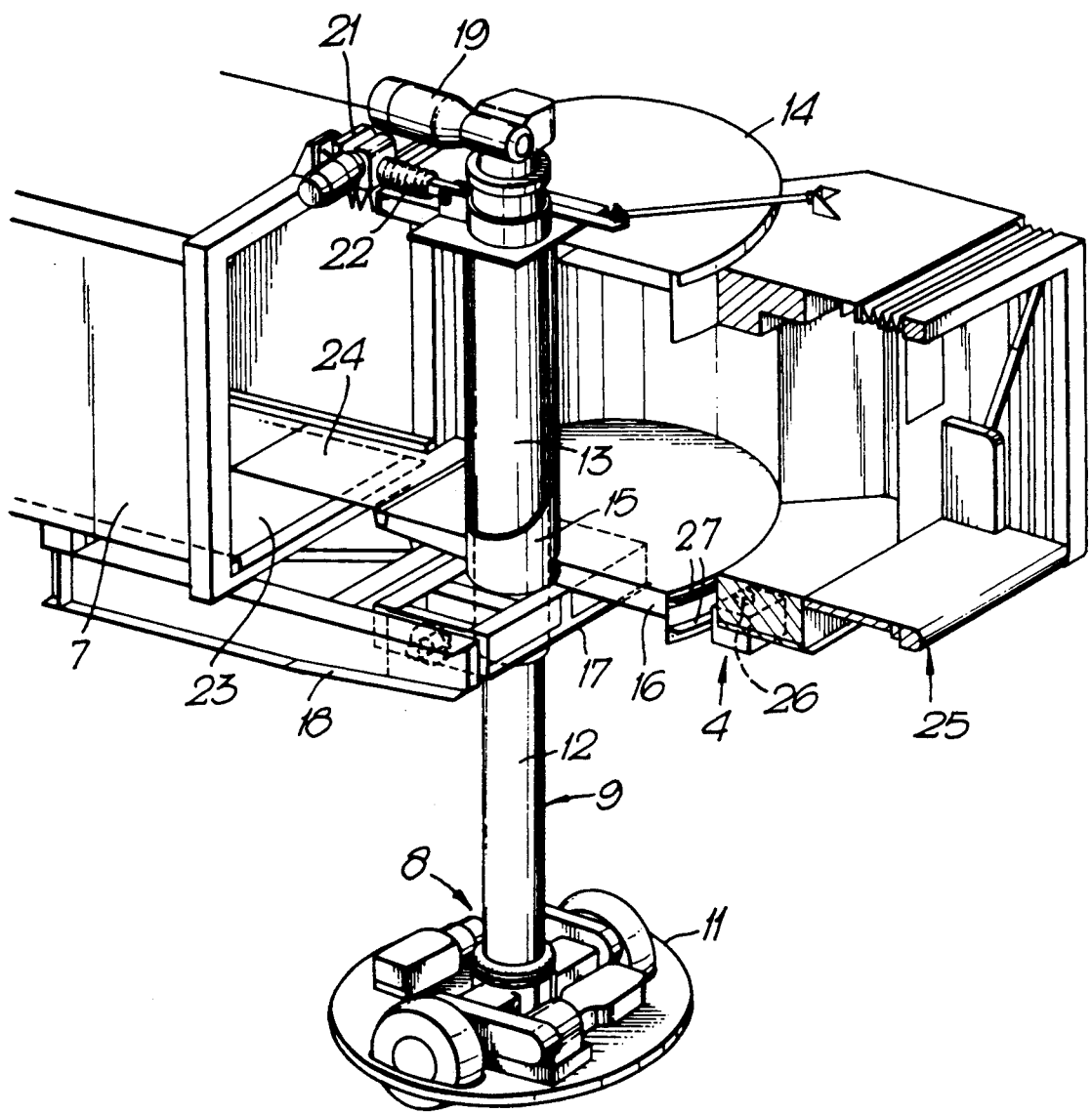
FIG. 3 represents a sectional perspective view of the cabin end of the airbridge.

The airbridge comprises a closed passageway 1 of rectangular cross section having a fixed end connected to a rotunda 1 adjoining an airport terminal building and a movable docking end 3, and is capable of being extended from a retracted position, shown in FIG. 1, to an extended docking position, shown in FIG. 2, in which a cabin assembly 4 at the docking end 3, is in engagement with the door opening of an aircraft.

For this purpose the passageway 1 is formed in three telescopic sections 5, 6 and 7 (FIG. 2), the outer one 7 of the sections being suitably supported, as will subsequently be described, by a wheeled support structure 8.

To enable the airbridge to be docked to aircraft doors of differing heights above the ground, the support structure comprises an elevator leg 9, which extends upwards from an electrically driven trolley 11 controlled from a control point within the cabin assembly 4.

The elevator leg 9 is in two telescopic sections 12, 13, the inner one 12 of which is fixed at its lower end to the trolley 11, and the outer one 13 of which extends upwards through the main part 14 of the cabin assembly 4 within a guard tube 15. The floor 16 of the main part of the docking assembly is carried by a framework 17 which is fixed to the lower end of the outer section 13 of the elevator leg, and is pivotally coupled to a pair of parallel beams 18 which are rigidly fixed to, and project forwardly from, the under surface of the outer passageway section 7 on either side of the framework.

The elevator leg 9 is screw driven by means of an electric motor 19 located at its top end, causing the outer section 13 of the leg to rise or fall and carry with it the cabin assembly 4 and the adjacent end of the passageway 1. This will cause the inclination of the passageway with respect to the ground to vary, but a level detector switch 21 at the top of the cabin assembly 4 becomes operative, on any departure of the assembly from the horizontal, to cause an electric-motor-driven jack 22, connected between the passageway section 7 and the cabin assembly, to return the cabin assembly to the horizontal position.

By locating the elevator leg at the extreme end of the airbridge, so that it acts on the cabin assembly 4, any movement of the leg produces precisely the same movement of the cabin assembly. Accordingly control of the movement of the cabin assembly is much simplified, compared with conventional airbridge systems in which elevator legs are disposed several feet from the end of the bridge. Any difference in the inclination of the cabin floor 16 and the floor 23 of the passageway section 7 is accommodated by a plate 24 hinged at one end, for example to the cabin floor 16, and freely slidable relative to the floor at the opposite end. By arranging for the cabin assembly to be maintained horizontal the elevator leg 9 is automatically maintained in the vertical position which avoids undue stresses that would be produced if the leg were to be inclined from the vertical through angles corresponding to the angular movement of the passageway sections.

The leg axis passes through the longitudinal axis of the airbridge, but in accordance with the preferred form of the invention, the cabin assembly 4 is displaced partially to one side of the airbridge passageway a shown in FIG. 4. This ensures an adequate space between the elevator leg guard tube 15 and the side of the cabin for passengers to pass freely through the cabin as indicated by the arrows, the minimum distance between the guard tube 15 and the wall of the cabin on the relevant side of guard tube being not less than the minimum width of the remainder of the passenger path through the airbridge.

The control equipment for controlling movements of the airbridge is located at the opposite side of the guard tube, close to the elevator leg. Consequently relatively short cables are required for connecting the control equipment to the electric motors for driving the trolley and operating the elevator leg than in the case with airbridges having the elevator legs spaced some distance from the cabin.

The cabin assembly 4 incorporates, in the usual way, a docking section 25 having a door opening 30 through which passengers can board or disembark from an aircraft, the docking section being capable of traversing around the main part-circular section 14 of the assembly to ensure alignment with the aircraft door. For this purpose the docking section carries rollers 26, only some of which are shown, which run on tracks 27 (FIG. 3) around the periphery of the floor 16 of the main section 14 of the assembly, any convenient means being employed for moving and controlling the position of the docking section.

Telescoping or concertina-type walls (not shown) around the main section 14 of the cabin assembly permit the docking section 25 to traverse around it whilst maintaining a passage between the two sections 14, 25 of the assembly. Such an arrangement is standard practice and need not be further described. Similarly manual controls, as at 28 (FIG. 4), are provided at one side of the docking section 25, which is provided in known manner, around the periphery of the door opening 30, with a deformable buffer 31 which is arranged to engage the side of the aircraft around the latter's door opening when the airbridge is in its operative position.

Although in the preferred arrangement the cabin assembly is displaced to one side of the main passageway sections, it will be appreciated that it could in some cases just be made wider, so that a passenger path exists at both sides of the elevator leg guard tube 15. Moreover the single leg could, if desired be replaced by two legs disposed one at each side of the cabin assembly 4, with the passenger path between them, although in such a case synchronisation of the leg movement will, of course, then be necessary.

We claim:

1. An airbridge, comprising:
   a telescopic passageway extending along a longitudinal axis between a passenger terminal end and an aircraft end;
   a cabin assembly at the aircraft end of the passageway pivotably coupled to the passageway by a horizontal transverse pivot, said cabin assembly having a floor and a top;
   a wheeled elevating support structure for the cabin assembly in the form of a single vertical, extendible elevator leg, said leg having an upper end which projects through the cabin assembly between the floor and the top of the cabin assembly substantially through the longitudinal axis of the passageway, said upper end of the leg being secured to the cabin assembly for effecting the raising or lowering of the latter, and of the adjacent end of the passageway, and leveling means for varying the relative angular position of the cabin assembly and the passageway for maintaining the floor of the cabin assembly and the axis of the elevating support structure substantially horizontal and substantially vertical, respectively, through varying angles of inclination of the passageway; and
   said cabin assembly being offset partially to one side of the longitudinal axis of the passageway to provide a path which permits traversal of passengers through the cabin assembly on one side of the elevator leg.

2. An airbridge, comprising:
   a telescopic passageway extending along a longitudinal axis between a passenger terminal end and an aircraft end;
   a cabin assembly at the aircraft end of the passageway pivotably coupled to the passageway by a horizontal transverse pivot said cabin assembly having a floor;
   a wheeled elevating supporting structure for the cabin assembly in the form of a single elevator leg having an axis, said leg being secured to the cabin assembly for effecting the raising or lowering of the latter, and of the adjacent end of the passageway;
   beams secured rigidly to, and projecting forwardly from, the aircraft end of the passageway and pivotably coupled to the elevator leg, for directly supporting said end of the passageway as well as the cabin assembly;
   leveling means for varying the relative angular position of the cabin assembly and the passageway to maintain the floor of the cabin assembly and the axis of the elevating support structure substantially horizontal and substantially vertical, respectively, through varying angles of inclination of the passageway; and said cabin assembly being offset partially to one side of the longitudinal axis of the passageway to provide a path which permits traversal of passengers through the cabin assembly on one side of the elevator leg.

3. The airbridge according to claim 5, wherein the leveling means includes a level detector switch carried by the cabin assembly and actuatable on departure of the cabin assembly from the horizontal, and return means acting between the cabin assembly and the adjacent passageway for returning the assembly to the horizontal inclination in response to operation of the switch.

4. The airbridge according to claim 2, wherein the leveling means includes a level detector switch carried by the cabin assembly and actuatable on departure of the cabin assembly from the horizontal, and return means acting between the cabin assembly and the adjacent passageway for returning the assembly to the horizontal inclination in response to operation of the switch.

* * * * *